Sept. 12, 1939. J. WIDMAN 2,172,647
ADJUSTABLE FLOAT VALVE FOR OIL BURNERS
Filed Feb. 21, 1938

INVENTOR:
JOSEPH WIDMAN,
BY:
Christian R. Nielsen.
ATTORNEY.

Patented Sept. 12, 1939

2,172,647

UNITED STATES PATENT OFFICE 2,172,647

ADJUSTABLE FLOAT VALVE FOR OIL BURNERS

Joseph Widman, Los Angeles, Calif.

Application February 21, 1938, Serial No. 191,769

2 Claims. (Cl. 137—68)

This invention relates to an adjustable float valve for oil burners, and particularly orchard heaters and it consists in the constructions, arrangements and combinations herein described and claimed.

It is an object of the invention to provide a novel adjusting means for regulating the flow of fuel oil to a burner, thereby regulating the flame of a burner.

It is also an object of the invention to provide a novel construction of needle valve and float assembly, means being associated with the float for adjusting the level thereof with corresponding adjustment of the needle valve.

It is a still further object of the invention to provide a float and needle valve assembly of extreme simplicity susceptible to ready installation and which is liable in a minimum degree to derangement.

Additional objects, advantages and features of invention will appear from the following description considered in conjunction with the accompanying drawing, wherein, Figure 1 is a vertical sectional view of the valve installed.

Figure 1:
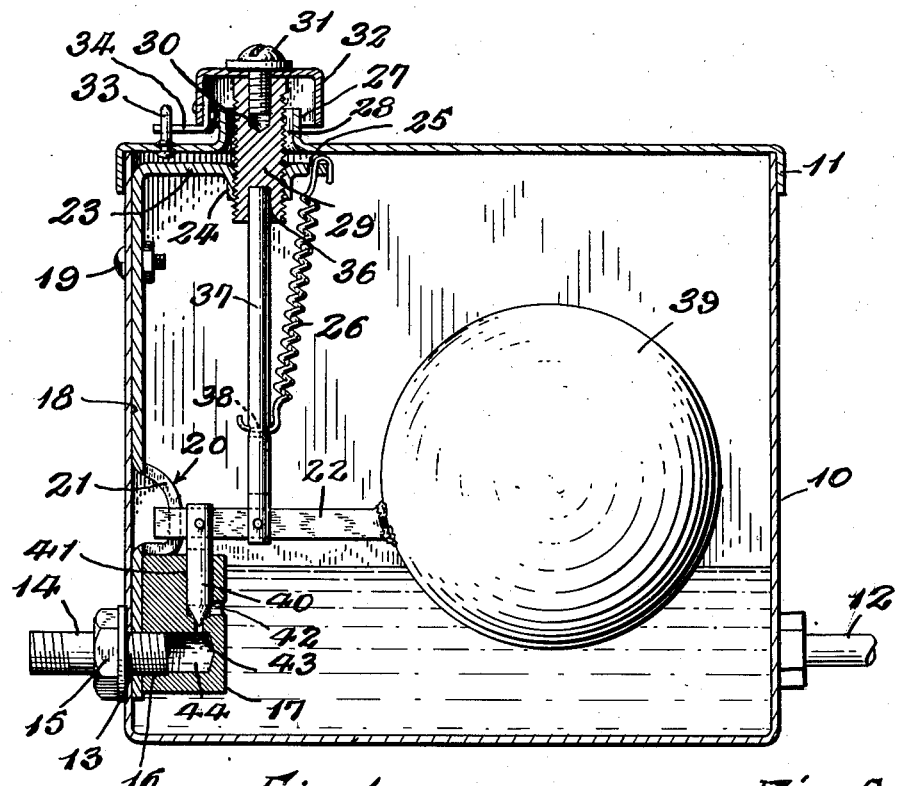
Figure 2:
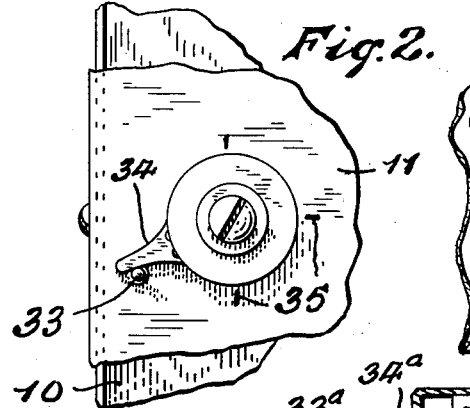
Figure 2 is a fragmentary top plan view of the adjusting knob.

There is illustrated a float valve reservoir 10 which may be of any desired capacity, including a removable cover 11. Adjacent the base of the reservoir an aperture 13 is formed for reception of a pipe fitting 14 which is screw-threaded into the aperture and secured by a nut 15. The outer end of the fitting 14 provides connection with a fuel line from a reservoir or pipe line (not shown), and the inner end is threadedly engaged in an aperture 16 of a valve block 17 which will be presently described. The reservoir also includes a pipe fitting 12 for connection with a burner, not shown.

A support bracket 18 is secured to a wall of the reservoir 10, the lower end being apertured to receive the inner end of the fitting 14 therethrough and as shown in Figure 1, the bracket is positioned between the wall of the reservoir and the valve block 17 and is thus secured. However, a bolt and nut 19 affords further rigidly to the bracket. At a point flush with the upper edge of the valve block 17, the bracket is bent inwardly to provide a loop portion 20, and extending longitudinally of the loop 20 there is a slot 21, which functions as a guide for a float lever 22. The upper end of the bracket 18 stops short of the upper edge of the reservoir and is bent at right angles defining an arm 23 which it will be noted lies in a plane parallel to the float lever 22.

The arm 23 has a downwardly directed internally threaded boss 24 and adjacent the extremity an aperture 25 is formed for anchorage of a tension spring 26 as will be described.

The cover 11 has an upstanding collar 27 defining an aperture 28 aligned with the boss 24 of the arm 23, the boss having threadedly engaged therein a stud 29 of a length extending above the collar 27. The upper end of the stud 29 has an axially threaded bore 30 receiving a screw 31 for securement of an operating knob or cap 32. The knob 32 preferably includes a downturned skirt circumscribing the collar 27, preventing ingress of water to the reservoir 10. The cover 11 also includes a stop pin 33 cooperable with a finger 34 of the knob, and also, the cover will include graduations 35 to indicate certain positions of the float and valve when the knob is rotated.

The lower end of the stud 29 has a smooth bore 36, freely receiving the upper end of a rod 37, the lower end of which is pivotally connected with the float lever 22, as shown. The rod 37 is provided adjacent its lower end with an aperture 38 for anchorage of the other end of the spring 26, the latter drawing the rod 37 into the bore 36 as well as tending to draw the lever 22 upwardly.

The float lever 22 has one end disposed within the slot 21, the other end carrying a float 39, and at a suitable point between the pivotal connection of the rod 37 and the loop 20, there is pivotally mounted a needle valve 40 reciprocably mounted in a bore 41 formed in the valve block 17. The bore 41 has an inlet port 42 opening upon the reservoir controlled by movement of the valve 40, the latter also regulating the opening 43 which establishes communication with chamber 44, of the valve block.

In use, with the regulator installed with a burner and it is desired to increase the flow of fuel, the knob 32 is rotated clockwise to a point desired, as indicated by the graduations 35. Such rotation of the knob raises the stud 29, allowing the spring 26 to raise the float lever 22 with consequent raising of the needle valve 40, increasing the flow of fuel through the ports 42, 43 and chamber 44. To decrease the flow of fuel, the knob would be rotated counter-clockwise, causing downward movement of the rod 37, which obviously causes restriction of fuel through the ports 42—43 and the chamber 44.

Figures 3, 4:
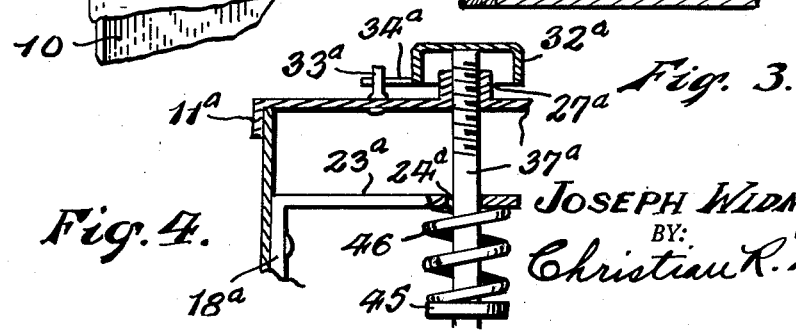
Figure 3 is a fragmentary perspective view of the valve block illustrating the mounting of the float lever.
Figure 4 is a detail sectional view of a modified form of adjusting means for the float lever.

In Figure 4, I have illustrated a modified form of the regulating means wherein a bracket 18—a comprises a laterally extended arm 23—a apertured as at 24—a to reciprocably receive a rod 37—a. Adjacent the upper end of the rod 37—a it is threaded for engagement in a threaded collar 27—a formed in the lid 11—a. The upper end of the rod 37—a has a skirted knob 32—a from which there extends an indicator pointer 34—a cooperable with a stop pin 33—a. At a suitable point upon the rod 37—a below the arm 23—a a collar or pin 45 is provided, and a helical spring 46 is positioned upon the rod, interposed between the arm 23—a and the collar 45.

The lower end of the rod 37—a will be connected with the float lever as previously described. In this form the spring 46 tends to move the rod 37—a downwardly, and adjustment of the float is regulated by turning of the knob 32—a.

Figure 5:
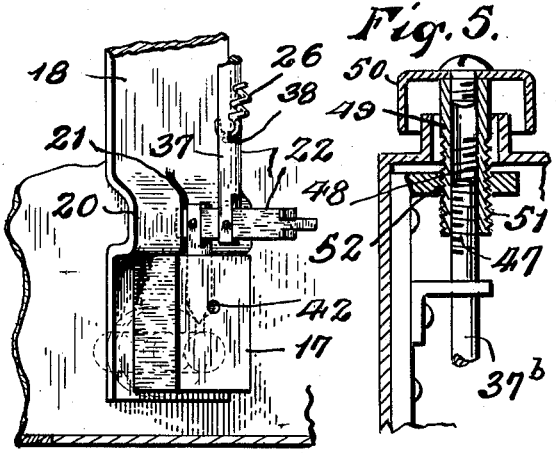
Figure 5 is a detail of a further modified form of adjusting means.

In Figure 5, I have illustrated the rod 37—b as having left-handed screw threads 47 engaged in a threaded bore 48 of an adjusting stud 49, the latter carrying the knob 50 for rotating the stud. The stud 49 has exterior right-hand screw threads as at 51, engaged with a threaded aperture of a bracket 52.

In use, the rod 37—b will be held against rotation by virtue of its connection with the float lever 22 and upon rotation of the knob 50 in a clockwise direction upward movement of the rod 37—a will be effected by virtue of the threaded engagement between the rod and stud. Opposite rotation of the knob will produce downward movement of the float lever.

From the foregoing, it will be seen that I have provided a means for regulating the flow of fuel oil to a burner, of simple and few moving parts and well adapted to installations employing a gravity or pressure feed supply, and while I have shown and described preferred constructions, this is by way of illustration only, and I consider as my own all such modifications in structure as fairly fall within the scope of the appended claims.

I claim:

1. In a device of the character described, a reservoir, a bracket upon an inner wall thereof, said reservoir having an outlet, a valve block in communication with the outlet, said valve block having a vertical port and a lateral port, the latter opening upon the reservoir and the vertical port, a reciprocable valve in the vertical port, a lever having pivotal connection with the valve, a float carried by the free end of the lever, an arm on the bracket extended in a plane substantially parallel to the lever, said arm having a threaded boss, a closure for the reservoir having an opening in registry with the boss, a threaded stud engaged in the boss, the lower end having a socket, a cap on the other end of the stud, a rod pivotally connected to the lever, one end having engagement with the socket, and spring means between the rod and the arm tending to raise the rod.

2. The structure of claim 1 in which the cap includes a downwardly turned skirt circumscribing the opening in the closure, and further includes a laterally extended finger cooperable with a stop pin upon full rotation of the cap.

JOSEPH WIDMAN.